(12) United States Patent
Assarpour

(10) Patent No.: US 8,861,524 B2
(45) Date of Patent: Oct. 14, 2014

(54) METHOD FOR TCAM LOOKUP USING A KEY IN MULTI-THREADED PACKET PROCESSORS

(75) Inventor: Hamid Assarpour, Arlington, MA (US)

(73) Assignee: Avaya Inc., Basking Ridge, NJ (US)

( * ) Notice: Subject to any disclaimer, the term of this patent is extended or adjusted under 35 U.S.C. 154(b) by 886 days.

(21) Appl. No.: 12/951,555

(22) Filed: Nov. 22, 2010

(65) Prior Publication Data

US 2011/0320705 A1    Dec. 29, 2011

Related U.S. Application Data

(60) Provisional application No. 61/359,076, filed on Jun. 28, 2010.

(51) Int. Cl.
| | |
|---|---|
| *H04L 12/00* | (2006.01) |
| *H04L 12/741* | (2013.01) |
| *H04L 12/46* | (2006.01) |
| *G06F 13/00* | (2006.01) |

(52) U.S. Cl.
CPC ............ *H04L 12/4625* (2013.01); *H04L 45/54* (2013.01)
USPC ......... 370/392; 370/395.3; 711/108; 718/102

(58) Field of Classification Search
CPC ........ G11C 15/00; G11C 15/04; H04L 45/00; H04L 47/10
USPC ................ 370/392, 395.3; 711/108; 718/102
See application file for complete search history.

(56) References Cited

U.S. PATENT DOCUMENTS

| | | | |
|---|---|---|---|
| 5,749,087 A * | 5/1998 | Hoover et al. ................ 711/108 |
| 6,633,548 B2 * | 10/2003 | Bachmutsky et al. ........ 370/255 |
| 7,613,755 B1 * | 11/2009 | Venkatachary ............... 708/212 |
| 7,864,776 B2 * | 1/2011 | Laamanen et al. ....... 370/395.31 |
| 7,933,282 B1 * | 4/2011 | Gupta et al. .................. 370/412 |
| 8,243,598 B2 * | 8/2012 | Battestilli et al. .......... 370/230.1 |
| 2002/0131432 A1 * | 9/2002 | Bachmutsky et al. ........ 370/408 |
| 2003/0223423 A1 * | 12/2003 | Yu et al. ........................ 370/392 |
| 2005/0281257 A1 * | 12/2005 | Yazaki et al. ................. 370/389 |
| 2007/0283357 A1 * | 12/2007 | Jeter et al. ..................... 718/102 |
| 2008/0192754 A1 * | 8/2008 | Ku et al. .................. 370/395.32 |
| 2008/0225874 A1 * | 9/2008 | Lee ............................... 370/412 |
| 2011/0320788 A1 * | 12/2011 | Assarpour ..................... 712/234 |

* cited by examiner

*Primary Examiner* — Hong Kim

(74) *Attorney, Agent, or Firm* — Anderson Gorecki & Rouille LLP

(57) ABSTRACT

A method, apparatus and computer program product for performing TCAM lookups in multi-threaded packet processors is presented. A Ternary Content Addressable Memory (TCAM) key is constructed for a packet and a Packet Reference Number (PRN) is generated. The TCAM key and the packet are tagged with the PRN. The TCAM key and the PRN are sent to a TCAM and in parallel the packet and the PRN are sent to a packet processing thread. The PRN is used to read the TCAM result when it is ready.

20 Claims, 3 Drawing Sheets

METHOD FOR TCAM LOOKUP USING A KEY IN MULTI-THREADED PACKET PROCESSORS

CROSS REFERENCE TO RELATED APPLICATIONS

The present application claims the benefit of U.S. Provisional Patent Application No. 61/359,076 filed on Jun. 28, 2010, which is incorporated herein by reference in its entirety.

BACKGROUND

Packet processors are used in network devices to handle the routing of packets. Packet processors are typically implemented as RISC (Reduced Instruction Set Computers) processor. In some instances these packet processors are implemented as programmable/multithreaded devices. The key benefits of multi-threaded packet processors include simpler instruction execution pipeline eliminating pipeline hazards, resource conflicts, branch delays, pipeline stalls, and pipeline stage bypasses. Another advantage of these type of processors is they provide a simpler programming model by hiding memory access latencies, hiding coprocessor latencies, eliminating branch delays, removing operand dependencies, provide better utilization of available memory bandwidth and better utilization of coprocessors.

Content-addressable Memory (CAM) is often used in computer networking devices. For example, when a network switch receives a data frame from one of its ports, it updates an internal table with the frame's source MAC address and the port it was received on. It then looks up the destination MAC address in the table to determine what port the frame needs to be forwarded to, and sends it out on that port. The MAC address table is usually implemented with a binary CAM so the destination port can be found very quickly, reducing the switch's latency.

Ternary CAMs are often used in network routers, where each address has two parts: the network address, which can vary in size depending on the subnet configuration, and the host address, which occupies the remaining bits. Each subnet has a network mask that specifies which bits of the address are the network address and which bits are the host address. Routing is done by consulting a routing table maintained by the router which contains each known destination network address, the associated network mask, and the information needed to route packets to that destination. Without CAM, the router compares the destination address of the packet to be routed with each entry in the routing table, performing a logical AND with the network mask and comparing it with the network address. If they are equal, the corresponding routing information is used to forward the packet. Using a ternary CAM for the routing table makes the lookup process very efficient. The addresses are stored using "don't care" for the host part of the address, so looking up the destination address in the CAM immediately retrieves the correct routing entry; both the masking and comparison are done by the CAM hardware.

SUMMARY

Conventional mechanisms such as those explained above suffer from a variety of deficiencies. One such drawback associated with this architecture is that packets may experience higher processing latency due to the number of active threads multiplexing the processor pipeline. To offset this drawback, many techniques can be applied to decrease the processing latency considerably compared to competing architectures. The processing latency gets impacted even more when TCAM search lookups are required.

Embodiments of the invention significantly overcome such deficiencies and provide mechanisms and techniques that provide an efficient method to overlap multi-threaded packet processing with TCAM search lookup which results in a hiding the TCAM latency.

In a particular embodiment of a method for providing for providing TCAM lookup in multi-threaded packet processors, the method includes constructing a Ternary Content Addressable Memory (TCAM) key for a packet and generating a Packet Reference Number (PRN). The method further includes tagging the TCAM key and the packet with the PRN. Additionally, the method includes sending the TCAM key the said PRN to a TCAM and in parallel sending the packet and said PRN to a packet processing thread. The method also includes using the PRN to read the TCAM result when it is ready.

Other embodiments include a computer readable medium having computer readable code thereon for providing for providing TCAM lookup in multi-threaded packet processors. The computer readable medium includes instructions for constructing a Ternary Content Addressable Memory (TCAM) key for a packet and instructions for generating a Packet Reference Number (PRN). The computer readable medium further includes instructions for tagging the TCAM key and the packet with the PRN. Additionally, the computer readable medium includes instructions for sending the TCAM key the said PRN to a TCAM and in parallel sending the packet and said PRN to a packet processing thread. The computer readable medium also includes instructions for using the PRN to read the TCAM result when it is ready.

Still other embodiments include a computerized device (e.g. a packet processor), configured to process all the method operations disclosed herein as embodiments of the invention. In such embodiments, the computerized device includes a memory system, a processor, communications interface in an interconnection mechanism connecting these components. The memory system is encoded with a process that provides TCAM lookup as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing TCAM lookup as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Basking Ridge, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The presently disclosed method and apparatus for TCAM lookusp in multi-threaded packet processors provides a very efficient method to overlap multi-threaded packet processing with TCAM search lookup which results in a hiding the TCAM latency.

Figure 1:
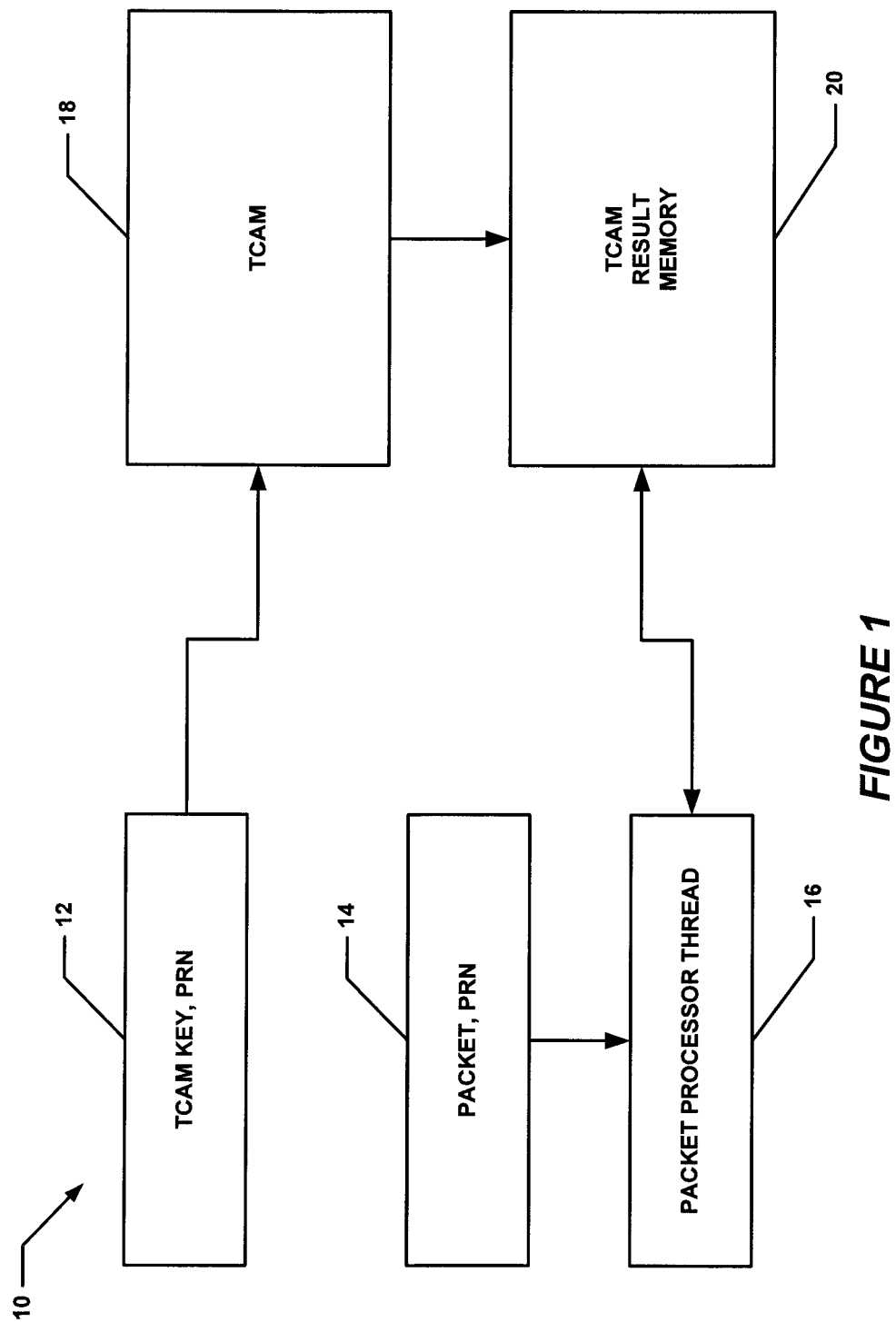
FIG. 1 comprises a block diagram of a portion of a packet processor showing elements required for performing TCAM lookups in a multi-threaded packet processor in accordance with embodiments of the invention.

Referring to FIG. 1, a block diagram of an environment 10 for performing TCAM lookups in multi-threaded packet processors is shown. Prior to sending a packet to the multi-threaded packet processor, the each packet is pre-classified based on its packet type and user configurations. This information is then used to extract appropriate fields from the packet, and to construct a TCAM key 12. A Packet Reference Number (PRN) is generated and both the TCAM key 12 and the packet 14 are tagged with PRN. The TCAM key and PRN are sent to the TCAM 18, and in parallel, the packet along with the PRN is sent to a packet processor thread 16.

At the time of key dispatch to TCAM, the PRN is used to set a Busy Flag in the corresponding entry in the TCAM result memory 20. Setting this flag implies that the result is not available yet. The Busy Flag serves as a semaphore.

When a thread in the packet processor needs the TCAM result, it issues a command over a coprocessor port/bus to fetch the TCAM result from the TCAM result memory 20. As part of the command, the thread sends the relevant PRN. Meanwhile, the TCAM 18 is performing the search operation on the provided key 12. When the result becomes available, the PRN is used to store the TCAM result into the TCAM result memory 20 and clear the Busy Flag. The PRN from the packet processor command is used to read the TCAM result memory 20. If the result is available; i.e., the Busy Flag is zero, the result is immediately sent to the packet processor thread 16. If the result is not available yet (Busy Flag is one), the request is queued until the result becomes available at which time the result is sent to the packet processor thread 16.

Figure 2:
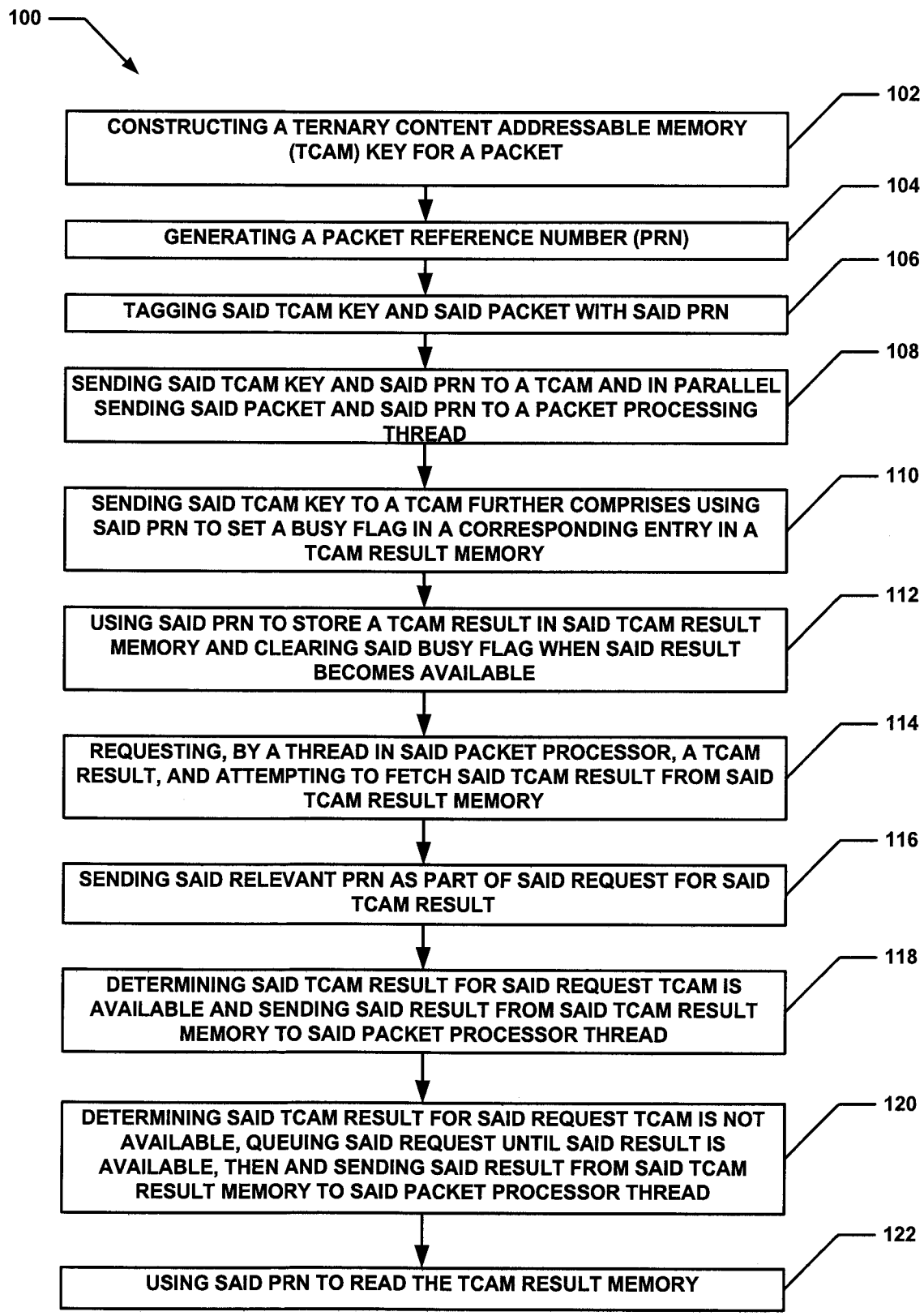
FIG. 2 depicts a flow diagram of a particular embodiment of a method for performing TCAM lookups in a multi-threaded packet processor in accordance with embodiments of the invention.

A flow chart of the presently disclosed method is depicted in FIG. 2. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 2, a particular embodiment of a method 100 for performing TCAM lookups in multi-threaded packet processors is shown. Method 100 begins with processing block 102 which discloses constructing a Ternary Content Addressable Memory (TCAM) key for a packet. Processing block 104 states generating a Packet Reference Number (PRN) and processing block 106 states tagging the TCAM key and the packet with the PRN.

Processing block 108 discloses sending the TCAM key and the PRN to a TCAM and in parallel sending the packet and the PRN to a packet processing thread. Processing block 110 states sending the TCAM key to a TCAM further comprises using the PRN to set a busy flag in a corresponding entry in a TCAM result memory. Processing block 112 recites using the PRN to store a TCAM result in the TCAM result memory and clearing the Busy Flag when the result becomes available. The Busy Flag is set when the result is not available and cleared when the result becomes available.

Processing block 114 discloses requesting, by a thread in the packet processor, a TCAM result, and attempting to fetch the TCAM result from the TCAM result memory. Processing block 116 states sending the relevant PRN as part of the request for the TCAM result. Processing block 118 recites determining the TCAM result for the request TCAM is available and sending the result from the TCAM result memory to the packet processor thread.

Processing block 120 discloses determining the TCAM result for the request TCAM is not available, queuing the request until the result is available, then and sending the result from the TCAM result memory to the packet processor thread. Processing block 122 states using the PRN to read the TCAM result memory.

In such a manner, multi-threaded packet processing is overlapped with TCAM search lookup which results in a hiding the TCAM latency thereby improving the performance of packet processors incorporating this technique.

Figure 3:
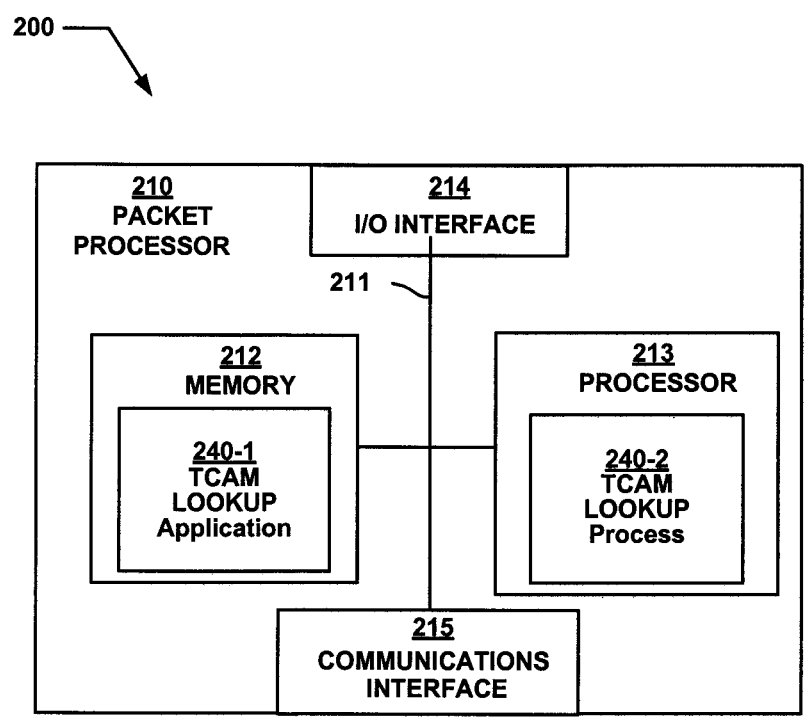
FIG. 3 illustrates an example system architecture for a packet processor system that performs TCAM lookups in accordance with embodiments of the invention.

FIG. 3 is a block diagram illustrating example architecture of a computer system (e.g., a packet processor) 210 that executes, runs, interprets, operates or otherwise performs TCAM lookup operating application 240-1 and TCAM lookup operating process 240-2 suitable for use in explaining example configurations disclosed herein. The computer system 210 may be any type of computerized device such as a personal computer, workstation, portable computing device, console, laptop, network terminal or the like. As shown in this example, the computer system 210 includes an interconnection mechanism 211 such as a data bus or other circuitry that couples a memory system 212, a processor 213, an input/output interface 214, and a communications interface 215. The communications interface 215 enables the computer system 210 to communicate with other devices (i.e., other computers) on a network (not shown).

The memory system 212 is any type of computer readable medium, and in this example, is encoded with TCAM lookup operating application 240-1 as explained herein. The TCAM lookup operating application 240-1 may be embodied as software code such as data and/or logic instructions (e.g., code stored in the memory or on another computer readable medium such as a removable disk) that supports processing functionality according to different embodiments described herein. During operation of the computer system 210, the processor 213 accesses the memory system 212 via the interconnect 211 in order to launch, run, execute, interpret or otherwise perform the logic instructions of TCAM lookup operating application 240-1. Execution of TCAM lookup operating application 240-1 in this manner produces processing functionality in the TCAM lookup operating process 240-2. In other words, the TCAM lookup operating process 240-2 represents one or more portions or runtime instances of TCAM lookup operating application 240-1 (or the entire TCAM lookup operating application 240-1) performing or executing within or upon the processor 213 in the computerized device 210 at runtime.

It is noted that example configurations disclosed herein include the TCAM lookup operating application 240-1 itself (i.e., in the form of un-executed or non-performing logic instructions and/or data). The TCAM lookup operating application 240-1 may be stored on a computer readable medium (such as a floppy disk), hard disk, electronic, magnetic, optical, or other computer readable medium. A TCAM lookup operating application 240-1 may also be stored in a memory system 212 such as in firmware, read only memory (ROM), or, as in this example, as executable code in, for example, Random Access Memory (RAM). In addition to these embodiments, it should also be noted that other embodiments herein include the execution of TCAM lookup operating application 240-1 in the processor 213 as the TCAM lookup operating process 240-2. Those skilled in the art will understand that the computer system 210 may include other processes and/or software and hardware components, such as an operating system not shown in this example.

During operation, processor 213 of computer system 200 accesses memory system 212 via the interconnect 211 in order to launch, execute, interpret or otherwise perform the logic instructions of the TCAM lookup application 240-1. Execution of TCAM lookup application 240-1 produces processing functionality in TCAM lookup process 240-2. In other words, the TCAM lookup process 240-2 represents one or more portions of the TCAM lookup application 240-1 (or the entire application) performing within or upon the processor 213 in the computer system 200.

It should be noted that, in addition to the TCAM lookup process 240-2, embodiments herein include the TCAM lookup application 240-1 itself (i.e., the un-executed or non-performing logic instructions and/or data). The TCAM lookup application 240-1 can be stored on a computer readable medium such as a floppy disk, hard disk, or optical medium. The TCAM lookup application 240-1 can also be stored in a memory type system such as in firmware, read only memory (ROM), or, as in this example, as executable code within the memory system 212 (e.g., within Random Access Memory or RAM).

In addition to these embodiments, it should also be noted that other embodiments herein include the execution of TCAM lookup application 240-1 in processor 213 as the TCAM lookup process 240-2. Those skilled in the art will understand that the computer system 200 can include other processes and/or software and hardware components, such as an operating system that controls allocation and use of hardware resources associated with the computer system 200.

In such a manner, the packet processor overlap the packet processing with TCAM search lookup which results in a hiding the TCAM latency thereby improving the performance of packet processors incorporating this technique.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method in which a computer system performs operations comprising:
   constructing a Ternary Content Addressable Memory (TCAM) key for a packet wherein said constructing a TCAM key comprises pre-classifying said packet based on a packet type of said packet and user configurations, and using said packet type and said user configurations to extract fields of said packet;
   generating a Packet Reference Number (PRN);
   tagging said TCAM key and said packet with said PRN;
   sending said TCAM key and said PRN to a TCAM and in parallel sending said packet and said PRN to a packet processing thread.

2. The method of claim 1 wherein said sending said TCAM key to a TCAM further comprises using said PRN to set a busy flag in a corresponding entry in a TCAM result memory.

3. The method of claim 2 further comprising using said PRN to store a TCAM result in said TCAM result memory and clearing said busy flag when said result becomes available.

4. The method of claim 2 further comprising requesting, by a thread in said packet processor, a TCAM result, and attempting to fetch said TCAM result from said TCAM result memory.

5. The method of claim 3 further comprising sending said relevant PRN as part of said request for said TCAM result.

6. The method of claim 3 further comprising determining said TCAM result for said request TCAM is available and sending said result from said TCAM result memory to said packet processor thread or determining said TCAM result for said request TCAM is not available, queuing said request until said result is available, then sending said result from said TCAM result memory to said packet processor thread.

7. The method of claim 2 wherein setting said busy flag serves as a semaphore implying that a result is not yet available.

8. The method of claim 4 further comprising using said PRN to read the TCAM result memory.

9. A non-transitory computer readable storage medium having computer readable code thereon for performing TCAM lookups, the medium including instructions in which a packet processor performs operations comprising:
   constructing a Ternary Content Addressable Memory (TCAM) key for a packet wherein said constructing a TCAM key comprises pre-classifying said packet based on a packet type of said packet and user configurations, and using said packet type and said user configurations to extract fields of said packet;
   generating a Packet Reference Number (PRN);
   tagging said TCAM key and said packet with said PRN;
   sending said TCAM key and said PRN to a TCAM and in parallel sending said packet and said PRN to a packet processing thread.

10. The computer readable storage medium of claim 9 wherein said sending said TCAM key to a TCAM further comprises using said PRN to set a busy flag in a corresponding entry in a TCAM result memory.

11. The computer readable storage medium of claim 10 further comprising using said PRN to store a TCAM result in said TCAM result memory and clearing said busy flag when said result becomes available.

12. The computer readable storage medium of claim 10 further comprising requesting, by a thread in said packet processor, a TCAM result, and attempting to fetch said TCAM result from said TCAM result memory.

13. The computer readable storage medium of claim 11 further comprising sending said relevant PRN as part of said request for said TCAM result.

14. The computer readable storage medium of claim 11 further comprising determining said TCAM result for said request TCAM is available and sending said result from said TCAM result memory to said packet processor thread or determining said TCAM result for said request TCAM is not available, queuing said request until said result is available, then sending said result from said TCAM result memory to said packet processor thread.

15. The compute readable storage medium of claim 10 wherein setting said busy flag serves as a semaphore implying that a result is not yet available.

16. The computer readable storage medium of claim 12 further comprising using said PRN to read the TCAM result memory.

17. A packet processor comprising:
a memory;
a processor;
a communications interface;
an interconnection mechanism coupling the memory, the processor and the communications interface; and
wherein the memory is encoded with an application providing TCAM lookup, that when performed on the processor, provides a process for processing information, the process causing the computer system to perform the operations of:
constructing a Ternary Content Addressable Memory (TCAM) key for a packet wherein said constructing a TCAM key comprises pre-classifying said packet based on a packet type of said packet and user configurations, and using said packet type and said user configurations to extract fields of said packet;
generating a Packet Reference Number (PRN);
tagging said TCAM key and said packet with said PRN;
sending said TCAM key and said PRN to a TCAM and in parallel sending said packet and said PRN to a packet processing thread.

18. The packet processor of claim 17 wherein said sending said TCAM key to a TCAM further comprises using said PRN to set a busy flag in a corresponding entry in a TCAM result memory.

19. The packet processor of claim 18 further comprising using said PRN to store a TCAM result in said TCAM result memory and clearing said busy flag when said result becomes available and using said PRN to read the TCAM result memory.

20. The packet processor of claim 18 wherein setting said busy flag serves as a semaphore implying that a result is not yet available.

* * * * *